US010710553B2

(12) United States Patent
Mori et al.

(10) Patent No.: US 10,710,553 B2
(45) Date of Patent: Jul. 14, 2020

(54) VEHICLE CONTROL DEVICE HAVING USER AUTHENTICATION UNIT PERFORMING AUTHENTICATION OF USER OF VEHICLE AND VEHICLE USE PERMISSION UNIT PERMITTING USE OF VEHICLE BY USER

(71) Applicant: HONDA MOTOR CO., LTD., Tokyo (JP)

(72) Inventors: Takashi Mori, Wako (JP); Atsuyuki Suzuki, Wako (JP); Hiroyuki Adachi, Tokyo (JP); Takahiro Komabayashi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/567,486

(22) Filed: Sep. 11, 2019

(65) Prior Publication Data

US 2020/0108794 A1 Apr. 9, 2020

(30) Foreign Application Priority Data

Oct. 3, 2018 (JP) .................................. 2018-188425

(51) Int. Cl.
*B60R 25/24* (2013.01)
(52) U.S. Cl.
CPC ................................... *B60R 25/24* (2013.01)
(58) Field of Classification Search
CPC ....... B60R 25/24; B60R 25/241; B60R 25/01; B60R 2325/108; B60R 25/2018; B60R 25/243; B60R 25/246; G07C 9/00309; G07C 9/00571; G07C 9/00563; G07C 2209/63; H04W 12/06; H04W 12/08; H04W 12/00503; H04W 12/00512; H04W 4/40; H04L 63/105; H04L 63/102
See application file for complete search history.

(56) References Cited

U.S. PATENT DOCUMENTS

| | | | | |
|---|---|---|---|---|
| 9,452,735 B2 * | 9/2016 | Miller | .................... | B60R 25/241 |
| 9,639,688 B2 * | 5/2017 | Westra | .................... | G06F 21/30 |
| 10,369,966 B1 * | 8/2019 | Higgins | ................. | H04W 12/06 |
| 10,589,718 B2 * | 3/2020 | Gennermann | .......... | E05B 81/54 |
| 10,604,114 B2 * | 3/2020 | Lin | ........................... | B60R 25/24 |
| 10,629,012 B1 * | 4/2020 | Gattu | ..................... | B60R 25/241 |
| 2010/0241857 A1 * | 9/2010 | Okude | .................. | H04L 9/3226 |
| | | | | 713/168 |

(Continued)

FOREIGN PATENT DOCUMENTS

JP 2016-115077 6/2016

*Primary Examiner* — Brian E Miller
(74) *Attorney, Agent, or Firm* — Rankin, Hill & Clark LLP (57) ABSTRACT

In a vehicle control device, an authentication success information storage unit stores, when authentication of a user by a user authentication unit is successful, authentication success information in a memory. A vehicle use permission unit permits, in a situation, the use of a vehicle by the user on condition that the authentication success information is stored in the memory; the situation is such that after authentication of the user by the user authentication unit is successful, authentication of the user by the user authentication unit is impossible when second authentication information is obtained by a second authentication information acquisition unit.

4 Claims, 4 Drawing Sheets

(56) References Cited

U.S. PATENT DOCUMENTS

| | | | |
|---|---|---|---|
| 2011/0112969 A1* | 5/2011 | Zaid | G06Q 10/02 |
| | | | 705/50 |
| 2013/0179005 A1* | 7/2013 | Nishimoto | B60R 25/24 |
| | | | 701/2 |
| 2014/0094987 A1* | 4/2014 | Healey | B60R 25/241 |
| | | | 701/1 |
| 2014/0309862 A1* | 10/2014 | Ricci | B60R 25/1004 |
| | | | 701/36 |
| 2015/0321641 A1* | 11/2015 | Abou Mahmoud | B60R 25/00 |
| | | | 701/2 |
| 2016/0055699 A1* | 2/2016 | Vincenti | H04W 12/04 |
| | | | 340/5.61 |
| 2017/0050617 A1* | 2/2017 | Penilla | B60L 53/68 |
| 2017/0187707 A1* | 6/2017 | Miu | H04W 12/0602 |
| 2017/0323505 A1* | 11/2017 | Gaddam | H04L 63/08 |
| 2018/0157534 A1* | 6/2018 | Yang | G06F 9/5038 |
| 2018/0261027 A1* | 9/2018 | Fujiwara | H04L 9/3297 |
| 2018/0261028 A1* | 9/2018 | Fujiwara | H04W 12/0602 |
| 2019/0109854 A1* | 4/2019 | Shimizu | H04L 63/0876 |
| 2019/0210560 A1* | 7/2019 | Decia | B60R 25/241 |
| 2019/0304220 A1* | 10/2019 | Lee | G07C 9/00571 |

\* cited by examiner

VEHICLE CONTROL DEVICE HAVING USER AUTHENTICATION UNIT PERFORMING AUTHENTICATION OF USER OF VEHICLE AND VEHICLE USE PERMISSION UNIT PERMITTING USE OF VEHICLE BY USER

INCORPORATION BY REFERENCE

The present application claims priority under 35 U.S.C. § 119 to Japanese Patent Application No. 2018-188425 filed on Oct. 3, 2018. The content of the application is incorporated herein by reference in its entirety.

BACKGROUND OF THE INVENTION

Field of the Invention

The present invention relates to a vehicle control device.

Description of the Related Art

Conventionally, there has been proposed such a configuration in a vehicle capable of shared use in car sharing that when a user who has got in the vehicle holds an IC card over a card reader of an on-vehicle apparatus to perform authentication and check-in, the on-vehicle apparatus turns on a vehicle power switch and after that, the vehicle power switch is maintained in an on state until the user turns off the vehicle power switch (for example, see Japanese Patent Laid-Open No. 2016-115077).

According to this configuration, even when the on-vehicle apparatus stops its operation due to a battery voltage drop, etc. after the user has performed a check-in, the vehicle power switch is maintained in an on state and consequently, the user can continue to drive the vehicle.

SUMMARY OF THE INVENTION

In the above conventional configuration, user authentication is performed when the use of a vehicle is started and after that, reauthentication is not necessary as long as the user does not perform a check-out operation. This may cause a problem that if the vehicle is stolen in a checked-in state, the vehicle is used by a person who has stolen the vehicle.

Therefore, to deal with the problem described above, it is conceivable to provide a configuration in which every time a user unlocks or starts a vehicle by using a portable terminal, user authentication is performed. However, in this case, if a failure has occurred in an authentication unit when the user who has interrupted the use of the vehicle tries to restart the use of the vehicle, authentication is impossible and therefore, the vehicle cannot be used.

The present invention has been made in view of the background described above, and it is an object of the present invention to provide a vehicle control device that avoids disabling the restart of the use of a vehicle by a user due to a failure in an authentication unit while preventing the vehicle from being used due to theft.

As one preferred aspect for achieving the object described above, a vehicle control device is provided which includes: a first authentication information acquisition unit that obtains first authentication information for authenticating use of a vehicle; a second authentication information acquisition unit that obtains second authentication information stored in a portable terminal carried by a user of the vehicle; a user authentication unit that performs authentication of the user based on the first authentication information and the second authentication information; and a vehicle use permission unit that permits, when authentication of the user by the user authentication unit is successful, the use of the vehicle by the user. The vehicle control device further includes an authentication success information storage unit that stores, when authentication of the user by the user authentication unit is successful, authentication success information in a storage unit. The vehicle use permission unit permits, in a situation, the use of the vehicle by the user on condition that the authentication success information is stored in the storage unit; the situation is such that after authentication of the user by the user authentication unit is successful and the use of the vehicle is started, the use of the vehicle is interrupted and after that, authentication of the user by the user authentication unit is impossible when the second authentication information is obtained by the second authentication information acquisition unit.

The above vehicle control device may be configured such that the first authentication information includes information on an available period of the vehicle and the vehicle use permission unit permits the use of the vehicle by the user on condition that the authentication success information is stored in the storage unit only within the available period.

The above vehicle control device may include: a first communication unit that performs communication with a management server for managing the use state of the vehicle; a second communication unit that performs communication with the portable terminal; a current position recognition unit that recognizes a current position of the vehicle; and a position information transmission unit. The position information transmission unit transmits, if communication with the management server by the first communication unit is possible, vehicle position information indicating the current position of the vehicle, the current position being recognized by the current position recognition unit, to the management server by the first communication unit; and transmits, when communication with the management server by the first communication unit is impossible, a position information transmission instruction for instructing the portable terminal to transmit portable terminal position information indicating a current position of the portable terminal to the management server, by the second communication unit.

Advantageous Effects of Invention

According to the above vehicle control system, when authentication of a user by the user authentication unit is successful, authentication success information is stored in the storage unit by the authentication success information storage unit. In addition, the vehicle use permission unit permits, in a situation, the use of the vehicle by the user on condition that the authentication success information is stored in the storage unit; the situation is such that after authentication of the user by the user authentication unit is successful and the use of the vehicle is started, the use of the vehicle is interrupted and after that, authentication of the user by the user authentication unit is impossible when the second authentication information is obtained by the second authentication information acquisition unit.

This can avoid disabling the restart of the use of the vehicle by the user who has once succeeded in authentication when authentication by the user authentication unit becomes impossible, while preventing the vehicle from

DETAILED DESCRIPTION OF THE PREFERRED EMBODIMENTS

1. Configuration of Vehicle Control Device

Figure 1:
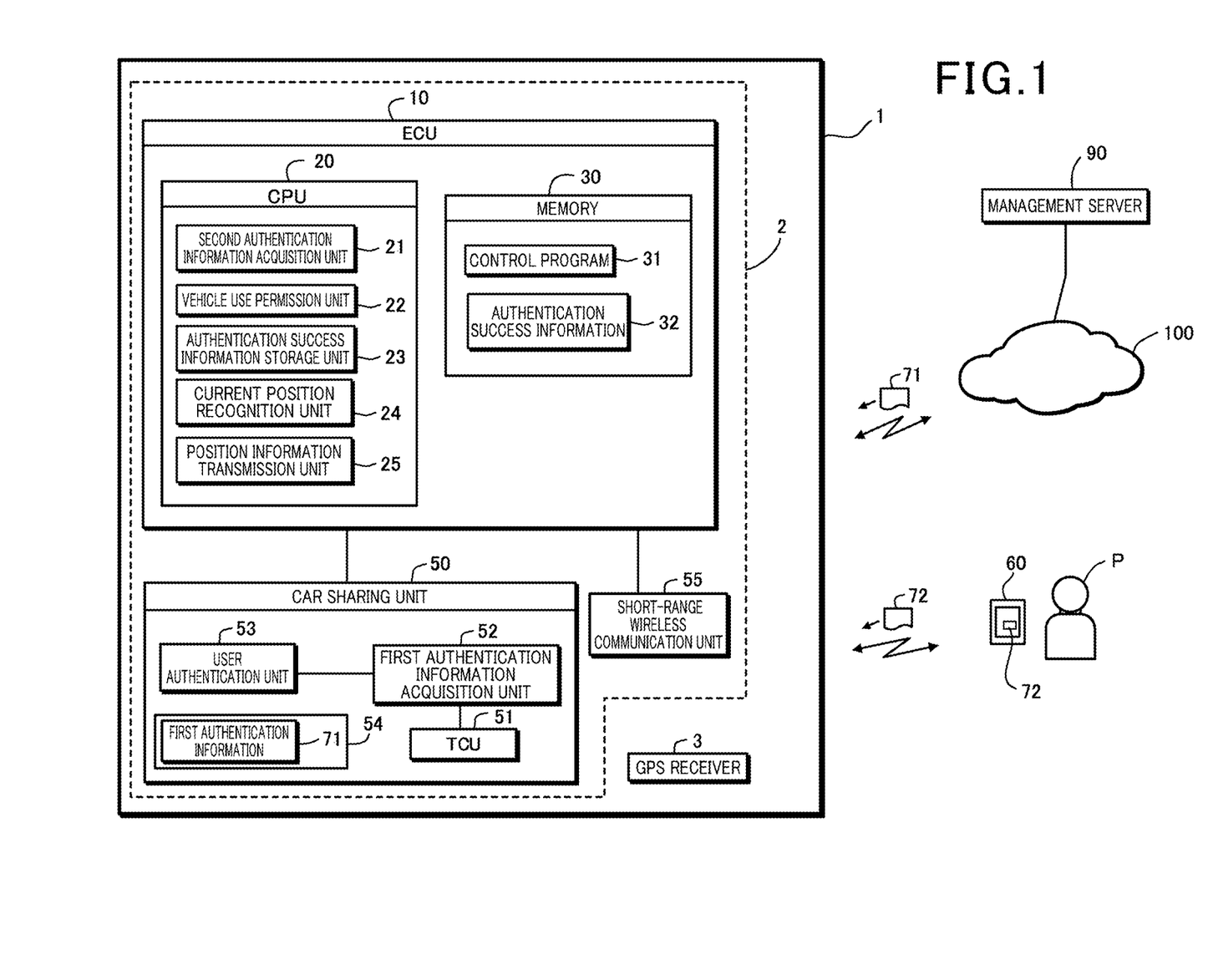
FIG. 1 shows a block diagram of a vehicle control device.

FIG. 1 shows a block diagram of a vehicle control device 2 of the embodiment. The vehicle control device 2, which is mounted on a vehicle 1 that is shared in car sharing, performs processing involved in the shared use of the vehicle 1 by performing communication with a portable terminal 60 that is carried by a user P of the vehicle 1 in car sharing and with a management server 90 that manages rental of the vehicle 1.

The vehicle 1 is provided with the vehicle control device 2 and in addition, for example, a GPS receiver 3 that receives a signal transmitted from a GPS (Global Positioning System) satellite and detects the current position (latitude, longitude) of the vehicle 1. The vehicle control device 2 includes an ECU (Electronic Control Unit) 10, a car sharing unit 50, and a short-range wireless communication unit 55 (corresponding to the second communication unit of the present invention).

The car sharing unit 50 includes a TCU (Telematics Communication Unit) 51 (corresponding to the first communication unit of the present invention), a first authentication information acquisition unit 52, a user authentication unit 53, and a memory 54. The TCU 51 performs communication with the management server 90 via a communication network 100. The first authentication information acquisition unit 52 obtains first authentication information 71 by receiving the first authentication information 71 transmitted from the management server 90 with the TCU 51 and stores the first authentication information 71 in the memory 54. The first authentication information 71 includes: user identification information for authenticating a user P who has made a reservation for use of the vehicle 1; and an available period of the vehicle 1 that has been set by the reservation.

The short-distance wireless communication unit 55 performs a short-range wireless communication with the portable terminal 60 in compliance with a communication standard such as BR/EDR (Bluetooth Basic Rate/Enhanced Data Rate, Bluetooth is a registered trademark), BLE (Bluetooth Low Energy), NFC, or Wi-Fi (registered trademark).

The ECU 10 is an electronic circuit unit constituted of a CPU (Central Processing Unit) 20, a memory 30, an interface circuit not illustrated, etc. The memory 30 stores a control program 31 for the vehicle control device 2 and authentication success information 32 indicating that authentication of the user P is successful.

The CPU 20 reads and executes the control program 31, thereby functioning as a second authentication information acquisition unit 21, a vehicle use permission unit 22, an authentication success information storage unit 23, a current position recognition unit 24, and a position information transmission unit 25.

The second authentication information acquisition unit 21 obtains second authentication information 72 by receiving the second authentication information 72 transmitted from the portable terminal 60 of the user P. The second authentication information 72 is transmitted, when the user P makes a reservation of the vehicle 1, from the management server 90 to the portable terminal 60 and is stored in a memory of the portable terminal 60. The second authentication information 72 includes information such as user identification information and an available period, similarly to the first authentication information 71. The second authentication information 72 functions as a virtual key for performing unlocking and locking, starting and stopping, etc. of the vehicle 1.

The vehicle use permission unit 22 permits the use of the vehicle 1 by the user P based on a result of authentication of the user P by the user authentication unit 53. The authentication success information storage unit 23 stores, when authentication of the user P by the user authentication unit 53 is successful, authentication success information 32 indicating that the authentication is successful, in the memory 30 (corresponding to the storage unit of the present invention).

The current position recognition unit 24 recognizes the current position of the vehicle 1 based on a position detection signal that is output from the GPS receiver 3. The position information transmission unit 25 transmits vehicle position information indicating the current position of the vehicle 1 which is recognized by the current position recognition unit 24, to the management server 90 via the TCU 51. In addition, though details are described later, when the transmission of the vehicle position information from the vehicle 1 to the management server 90 becomes impossible due to a failure of the TCU 51, a failure in a communication line, or the like, the position information transmission unit 25 transmits a position information transmission instruction for instructing the portable terminal 60 to transmit portable terminal position information indicating the current position of the portable terminal 60 to the management server 90.

2. Reservation for Use of Vehicle and User Authentication Processing

According to the flowchart shown in FIG. 2, a series of processing executed by the vehicle control device 2, portable terminal 60, and management server 90 in response to the operations by the user P for use reservation and use start of the vehicle 1 will be described.

Figure 2:
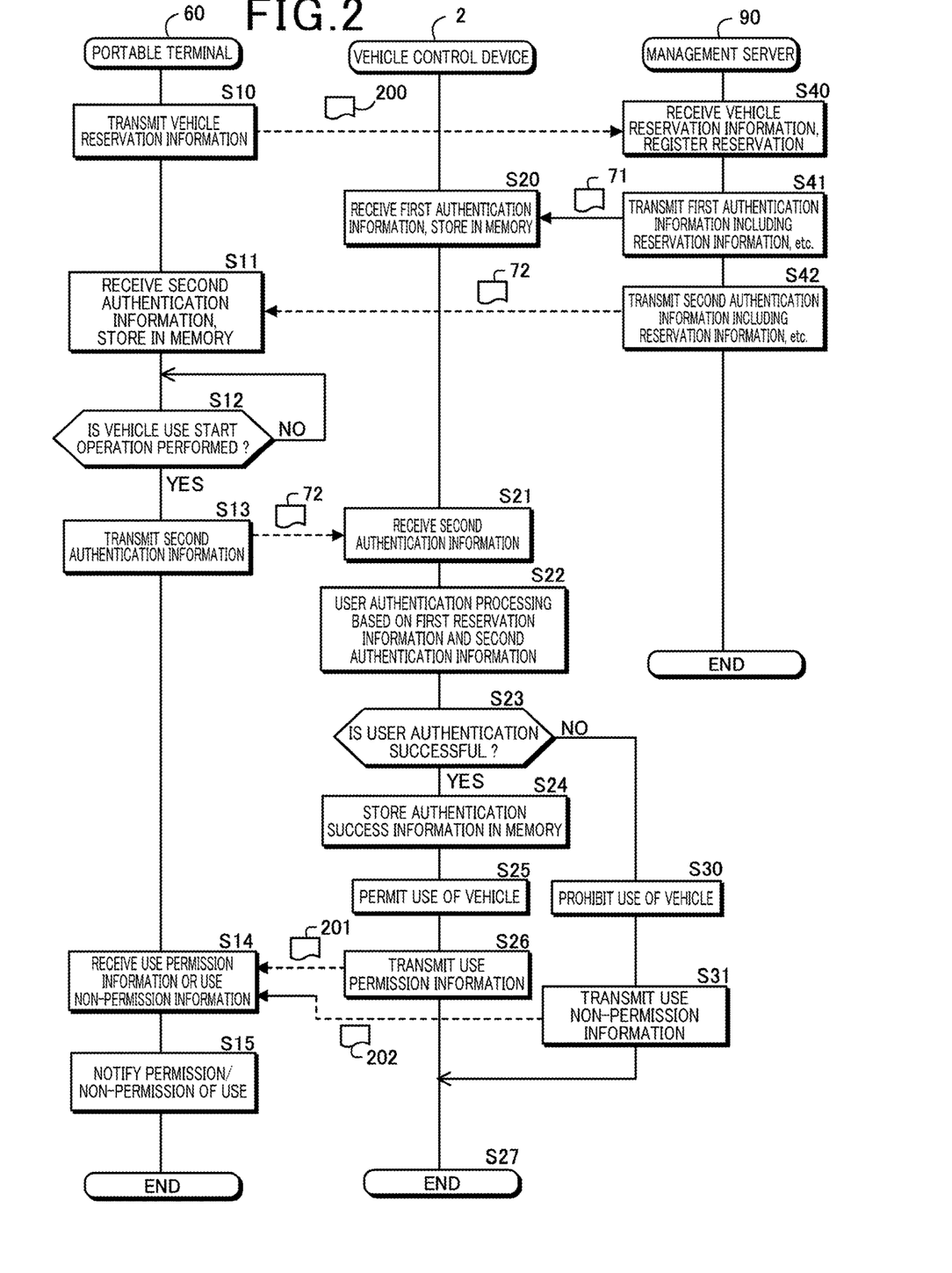
FIG. 2 shows a flowchart of user authentication processing.

At step S10 in FIG. 2, the portable terminal 60 transmits, when the operation for use reservation of the vehicle 1 is performed by the user P, vehicle reservation information 200 indicating the contents of the reservation to the management server 90. The management server 90 receives the vehicle reservation information 200 at step S40 and performs reservation registration of the vehicle 1 according to a reservation condition specified by the vehicle reservation information 200.

At a subsequent step S41, the management server 90 transmits the first authentication information 71 including both the identification information of the user P and the reservation information of the vehicle 1 to the vehicle control device 2. In addition, at a subsequent step S42, the management server 90 transmits the second authentication information 72 including both the identification information of the user P and the reservation information of the vehicle 1 to the portable terminal 60. In the car sharing unit 50 of the vehicle control device 2, the first authentication information acquisition unit 52 obtains the first authentication information 71 by receiving the first authentication information 71 via the TCU. Then, the first authentication information acquisition unit 52 stores the obtained first authentication information 71 in the memory 54.

The portable terminal 60, at step S11, receives the second authentication information 72 from the management server 90 and stores it in a memory. At a subsequent step S12, if the start operation for the vehicle 1 is performed by the user P, the portable terminal 60 advances the process to step S13 and transmits the second authentication information 72 to the vehicle control device 2.

The second authentication information acquisition unit 21 of the vehicle control device 2 receives, at step S21, the second authentication information 72 from the portable terminal 60 via the short-distance wireless communication unit 55. At a subsequent step S22, the user authentication unit 53 of the car sharing unit 50 executes authentication processing for the user P based on the first authentication information 71 stored in the memory 54 and the second authentication information 72 obtained by the second authentication information acquisition unit 21. The user authentication unit 53 determines, when the first authentication information 71 and the second authentication information 72 match, that the user P is a person who has made the reservation (authentication is successful). On the other hand, it determines, when the first authentication information 71 and the second authentication information 72 do not match, that the user P is not a person who has made the reservation (authentication fails).

At a subsequent step S23, the authentication success information storage unit 23 determines whether authentication of the user P by the user authentication unit 53 is successful. Then, the authentication success information storage unit 23 advances, when authentication of the user P is successful, the process to step S24 and stores the authentication success information 32 in the memory 30. On the other hand, the authentication success information storage unit 23 advances, when authentication of the user P fails, the process to step S30; in this case, storage of the authentication success information 32 in the memory 30 is not performed.

When authentication of the user P is successful, the vehicle use permission unit 22 permits the use of the vehicle 1 at step S25 and transmits use permission information 201 indicating that the use of the vehicle 1 has become possible, to the portable terminal 60. On the other hand, if authentication of the user P fails, the vehicle use permission unit 22 prohibits the use of the vehicle 1 at step S30 and transmits, at a subsequent step S31, use non-permission information 202 indicating that the use of the vehicle 1 is impossible, to the portable terminal 60.

The portable terminal 60 receives, at step S14, the use permission information 201 or the use non-permission information 202 from the vehicle control device 2. Then, at a subsequent step S15, the portable terminal 60 notifies, when receiving the use permission information 201, that the use of the vehicle 1 has become possible, by display on a display part or by voice output. Confirming this notification, the user P starts the use of the vehicle 1.

On the other hand, when receiving the use non-permission information 202, the portable terminal 60 notifies that the use of the vehicle 1 is impossible, by display on a display part or by voice output. This prohibits persons other than a person who has made the reservation from using the vehicle 1.

3. Processing of User Reauthentication

Figure 3:
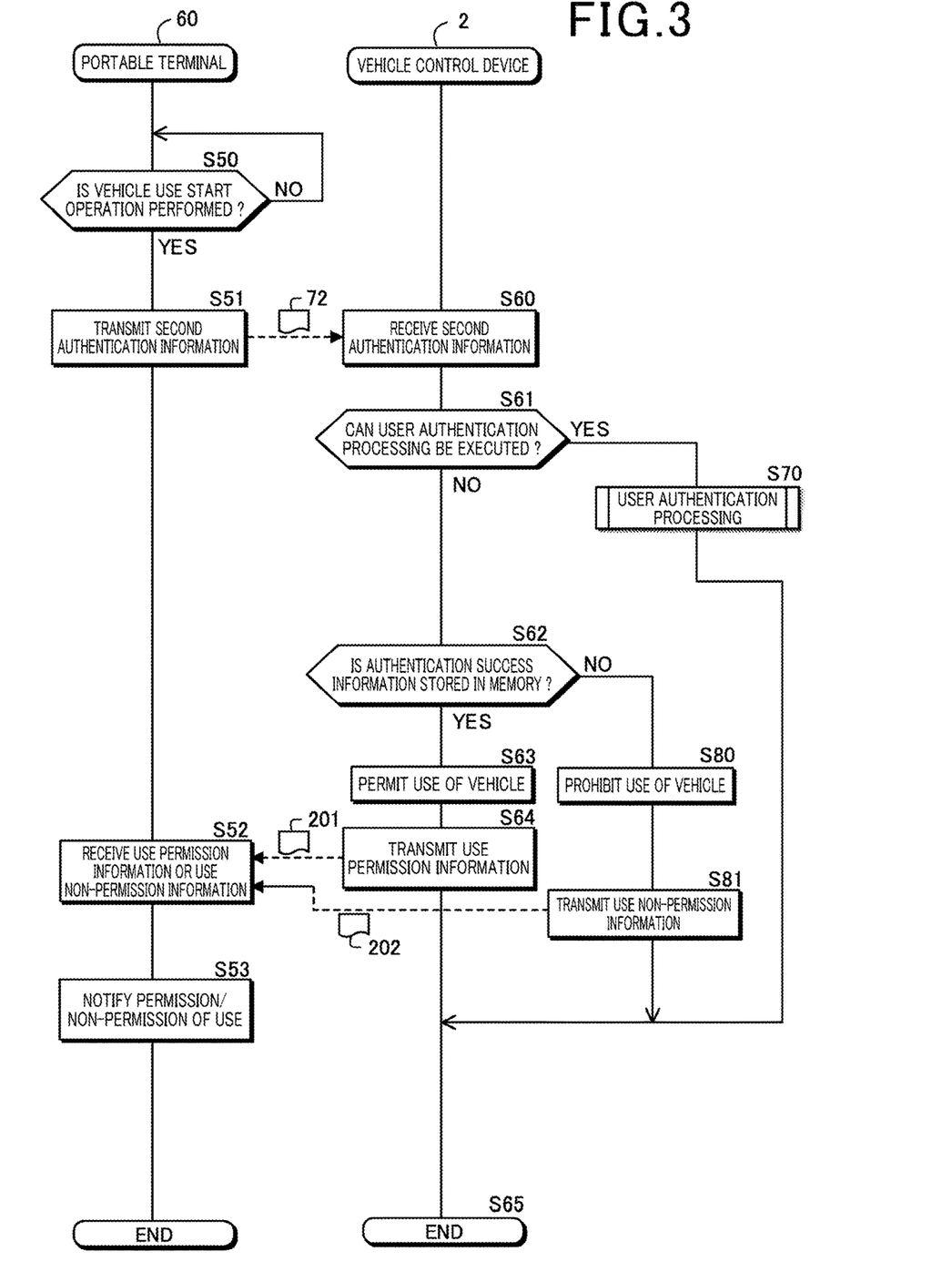
FIG. 3 shows a flowchart of user reauthentication processing.

According to the flowchart shown in FIG. 3, reauthentication processing will be described which is performed when a person P who has started the use of the vehicle 1 after successful authentication by the user authentication unit 53, interrupts the use of the vehicle 1 and gets off and after that, performs the operation of restarting the use of the vehicle 1.

The portable terminal 60 advances, when the operation for starting the use (in this case, restarting the use) is performed by the user P at step S50, the process to step S51 and transmits the second authentication information 72 to the vehicle control device 2. The second authentication information acquisition unit 21 of the vehicle control device 2 obtains the second authentication information 72 at step S60; and at a subsequent step S61, the execution of the second authentication information acquisition unit 21 determines whether authentication processing for the user P by the car sharing unit 50 is possible.

Then, the second authentication information acquisition unit 21 advances, if authentication processing for the user P by the car sharing unit 50 is possible, the process to step S70. At step S70, the user authentication unit 53 of the car sharing unit 50 executes authentication processing for the user P similarly to steps S22 to S27, S30, and S31 in FIG. 2 described above.

On the other hand, if execution of authentication processing for the user P by the car sharing unit 50 is impossible, the second authentication information acquisition unit 21 advances the process to step S62. In this case, the causes of a failure of the car sharing unit 50 include: an operation failure in the user authentication unit 53; and a reading failure of the first authentication information 71 stored in the memory 54. In addition, in a configuration in which the first authentication information 71 is not stored in the memory 54 and the first authentication information is obtained from the management server 90 via the TCU 51 every time authentication processing for the user P is executed, the execution of authentication processing also becomes impossible when communication via the TCU 51 becomes impossible.

At step S62, the vehicle use permission unit 22 determines whether the authentication success information 32 is stored in the memory 30. Then, the vehicle use permission unit 22 advances, if the authentication success information 32 is stored in the memory 30, the process to step S63 and permits the use of the vehicle 1. This allows the user P who has succeeded in authentication at the time of starting the use of the vehicle 1 to restart the use of the vehicle 1 even in a case where the car sharing unit 50 fails. At a subsequent step S64, the vehicle use permission unit 22 transmits the use permission information 201 to the portable terminal 60.

On the other hand, if the authentication success information 32 is not stored in the memory 30, the vehicle use permission unit 22 advances the process to step S80 and prohibits the use of the vehicle 1. This prohibits persons other than the user P who has succeeded in authentication from using the vehicle 1, thereby being able to prevent the vehicle 1 from being stolen. At a subsequent step S81, the vehicle use permission unit 22 transmits the use non-permission information 202.

The portable terminal 60 receives, at step S52, the use permission information 201 or the use non-permission information 202 from the vehicle control device 2. Then, at a subsequent step S53, the portable terminal 60 notifies, when receiving the use permission information 201, that the use of the vehicle 1 is possible, by display on a display part or by output of voice guidance from a speaker. In addition, the portable terminal 60 notifies, when receiving the use non-permission information 202, that the use of the vehicle 1 is not permitted, by display on a display part or by output of voice guidance from a speaker.

4. Vehicle Monitoring Processing During Available Period

According to the flowchart shown in FIG. 4, monitoring processing for the vehicle 1 during an available period will be described.

In the vehicle control device 2, the position information transmission unit 25 repeatedly executes the processing of steps S100 to S104 during a rental period of the vehicle 1. The position information transmission unit 25 advances, every time a first predetermined time has passed at step S100, the process to step S101 and determines whether the transmission of vehicle position information indicating the current position of the vehicle 1 to the management server 90 is possible.

Then, the position information transmission unit 25 advances, if the transmission of the vehicle position information to the management server 90 is possible, the process to step S103. At step S103, the current position recognition unit 24 recognizes the current position of the vehicle 1 based on a position detection signal that is output from the GPS receiver 3. At a subsequent step S104, the position information transmission unit 25 transmits the vehicle position information to the management server 90 and advances the process to step S100.

On the other hand, if the transmission of the vehicle position information to the management server 90 is impossible, the position information transmission unit 25 advances the process from step S101 to step S105. Here, the transmission of the vehicle position information to the management server 90 becomes impossible in a case where the TCU 51 has failed or a communication failure between the vehicle control device 2 and the management server 90 has occurred.

At step S105, the position information transmission unit 25 transmits to the portable terminal 60 a position information transmission instruction 220 for instructing the portable terminal 60 to transmit the portable terminal position information indicating the current position of the portable terminal 60 to the management server 90.

The portable terminal 60 advances, when receiving the position information transmission instruction 220 from the vehicle control device 2 at step S90, the process to step S91. Then, the portable terminal 60 repeatedly executes the processing of subsequent steps S91 to S93 during a rental period of the vehicle 1. The portable terminal 60 advances the process to step S92 every time a second predetermined time has passed at step S91; and recognizes the current position of the portable terminal 60 based on a position detection signal that is output from a built-in GPS receiver (not illustrated). At the next step S93, the portable terminal 60 transmits the portable terminal position information to the management server 90.

Thus, if the transmission of the vehicle position information to the management server 90 becomes impossible in the vehicle control device 2, the portable terminal position information is transmitted from the portable terminal 60 to the management server 90. In this case, the portable terminal 60 is carried by the user P who is riding in the vehicle 1 and therefore, the portable terminal position information indicates the current position of the vehicle 1.

Therefore, the management server 90 can monitor the current position of the vehicle 1 by receiving the vehicle position information transmitted from the vehicle control device 2 every time a first predetermined time has passed during a rental period of the vehicle 1. In addition, even when the transmission of the vehicle position information by the vehicle control device 2 becomes impossible, the management server 90 can recognize the current position of the vehicle 1 and monitor the use state of the vehicle 1 by receiving the portable terminal position information that is transmitted from the portable terminal 60 every time a second predetermined time has passed.

In addition, the management server 90 notifies the police, etc. when recognizing a suspicious behavior of the vehicle 1 from the monitoring state at the current position of the vehicle 1. In this case, suspicious behaviors of the vehicle 1 include an excess of speed limit, a sudden start, a sudden stop, a traffic violation, etc.

5. Other Embodiments

In the above embodiment, the vehicle use permission unit 22 permits, when the execution of authentication processing for the user P by the user authentication unit 53 of the car sharing unit 50 is impossible, the use of the vehicle 1 by the user P on the condition that the authentication success information 32 is stored in the memory 30. In a configuration to which a further limit has been added, the use of the vehicle 1 by the user P may be permitted on the condition that the authentication success information 32 is stored in the memory 30 only within a rental period of the vehicle 1. This configuration can prevent persons other than the user P who has made a reservation for the use of the vehicle 1 from using the vehicle 1.

Figure 4:
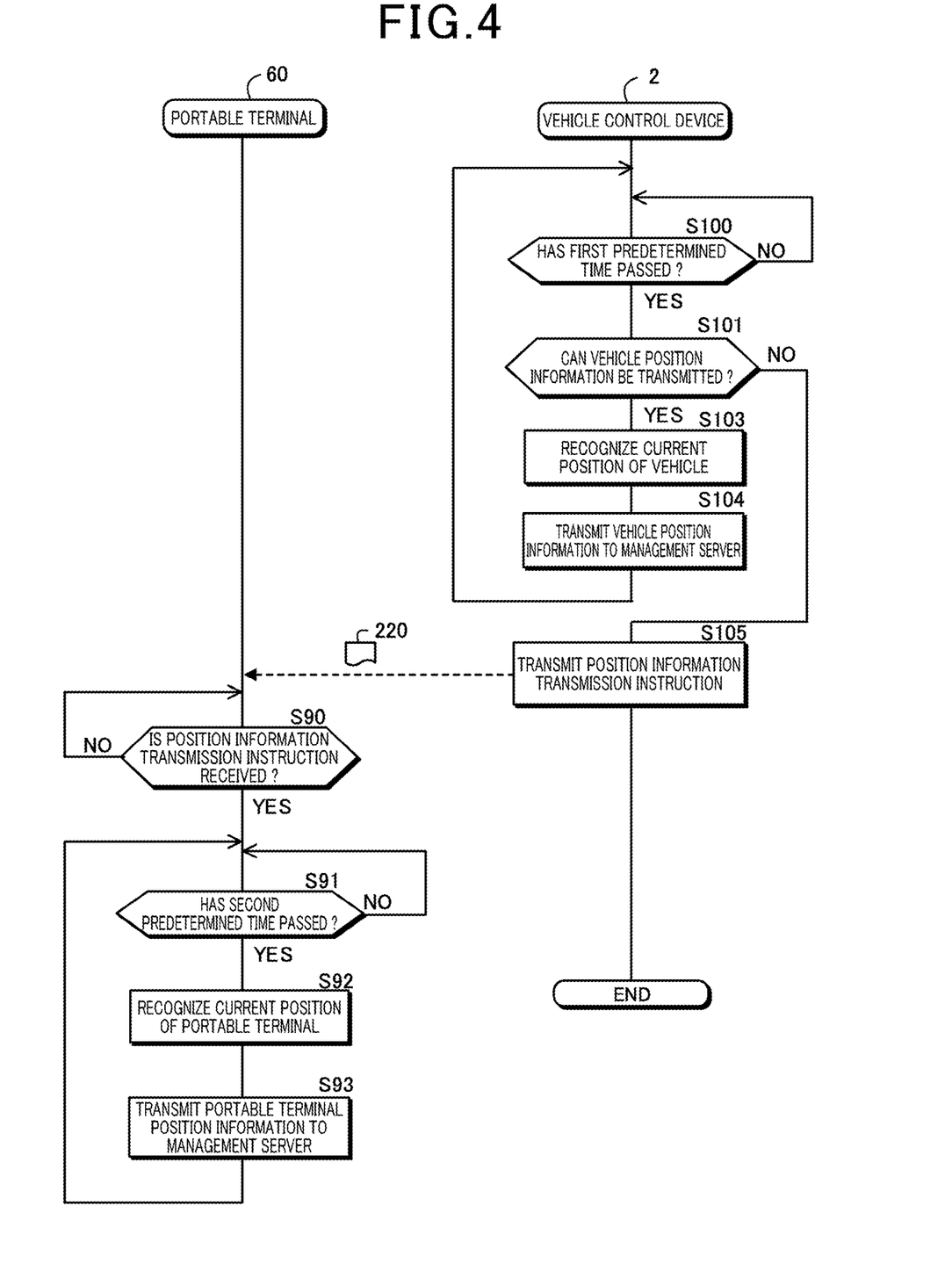
FIG. 4 shows a flowchart of monitoring processing during an available period.

In the above embodiment, the position information transmission unit 25 of the vehicle control device 2 determines, at step S101 shown in FIG. 4, whether the transmission of the vehicle position information is possible; however, as another configuration, whether the transmission of the vehicle position information is possible may be determined on the management server 90 side. For example, the management server 90 may transmit, if not having received the vehicle position information from the vehicle control device 2 even when a first predetermined time has passed during a rental period of the vehicle 1, the position information transmission instruction 220 to the portable terminal 60. In this case, the vehicle control device of the present invention is configured so that the management server 90 determines whether the transmission of the vehicle position information is possible and transmits a position information transmission instruction 220 to the portable terminal 60.

It should be noted that although FIG. 1 is a schematic diagram illustrating a functional configuration of the vehicle control device 2 while dividing it by main processing contents for easy understanding of the present invention, the configuration of the vehicle control device 2 may be a configuration by another division. In addition, processing for each component may be either executed by one hardware unit or executed by a plurality of hardware units. Further, processing for each component indicated in FIG. 1 may be either executed by one program or executed by a plurality of programs.

REFERENCE SIGNS LIST

1 . . . vehicle, 2 . . . vehicle control device, 10 . . . ECU, 20 . . . CPU, 21 . . . second authentication information acquisition unit, 22 . . . vehicle use permission unit, 23 . . . authentication success information storage unit, 24 . . . current position recognition unit, 25 . . . position information transmission unit, 30 . . . memory, 31 . . . control program, 32 . . . authentication success information, 50 . . . car sharing unit, 51 . . . TCU (first communication unit), 52 . . . first authentication information acquisition unit, 53 . . . user authentication unit, 54 . . . memory, 55 . . . short-range wireless communication unit (second communication unit), 60 . . . portable terminal, 71 . . . first authentication information, 72 . . . second authentication information, 90 . . . management server.

What is claimed is:

1. A vehicle control device, comprising:
a first authentication information acquisition unit configured to obtain first authentication information for permitting use of a vehicle to a user of the vehicle;
a second authentication information acquisition unit configured to obtain second authentication information that is stored in a portable terminal carried by the user of the vehicle and that is associated with the user;
a user authentication unit configured to perform authentication of the user based on the first authentication information and second authentication information; and
a vehicle use permission unit configured to permit the use of the vehicle by the user when authentication of the user by the user authentication unit is successful;
the vehicle control device further comprising an authentication success information storage unit configured to store authentication success information in a storage unit when authentication of the user by the user authentication unit is successful, wherein
the vehicle use permission unit permits, in a situation, the use of the vehicle by the user on condition that the authentication success information is stored in the storage unit, the situation being such that after authentication of the user by the user authentication unit is successful and the use of the vehicle is started, the use of the vehicle is interrupted and, after the interruption, authentication of the user by the user authentication unit is not successful when the second authentication information is obtained by the second authentication information acquisition unit.

2. The vehicle control device according to claim 1, wherein
the first authentication information includes information on an available time period of the vehicle; and
the vehicle use permission unit permits the use of the vehicle by the user on condition that the authentication success information is stored in the storage unit only within the available time period.

3. The vehicle control device according to claim 2, comprising:
a first communication unit configured to perform communication with a management server for managing a use state of the vehicle;
a second communication unit configured to perform communication with the portable terminal;
a current position recognition unit configured to recognize a current position of the vehicle; and
a position information transmission unit configured to
transmit, when communication with the management server by the first communication unit is possible, vehicle position information to the management server by the first communication unit, the vehicle position information indicating the current position of the vehicle, the current position being recognized by the current position recognition unit, and
transmit, when communication with the management server by the first communication unit is prevented, a position information transmission instruction by the second communication unit, the position information transmission instruction instructing the portable terminal to transmit portable terminal position information to the management server, the portable terminal position information indicating a current position of the portable terminal.

4. The vehicle control device according to claim 1, comprising:
a first communication unit configured to perform communication with a management server for managing a use state of the vehicle;
a second communication unit configured to perform communication with the portable terminal;
a current position recognition unit configured to recognize a current position of the vehicle; and
a position information transmission unit configured to
transmit, when communication with the management server by the first communication unit is possible, vehicle position information to the management server by the first communication unit, the vehicle position information indicating the current position of the vehicle, the current position being recognized by the current position recognition unit, and
transmit, when communication with the management server by the first communication unit is prevented, a position information transmission instruction by the second communication unit, the position information transmission instruction instructing the portable terminal to transmit portable terminal position information to the management server, the portable terminal position information indicating a current position of the portable terminal.

* * * * *